US012762185B2

(12) United States Patent
Haywood

(10) Patent No.: US 12,762,185 B2
(45) Date of Patent: Oct. 13, 2026

(54) ISLANDS TECHNIQUE OF GRAPH SYNTHESIS

(71) Applicant: Grant Haywood, Tierjas, NM (US)

(72) Inventor: Grant Haywood, Tierjas, NM (US)

( * ) Notice: Subject to any disclaimer, the term of this patent is extended or adjusted under 35 U.S.C. 154(b) by 0 days.

(21) Appl. No.: 19/011,499

(22) Filed: Jan. 6, 2025

(65) Prior Publication Data

US 2025/0322017 A1 Oct. 16, 2025

Related U.S. Application Data

(60) Provisional application No. 63/623,333, filed on Jan. 21, 2024.

(51) Int. Cl.
*G06F 16/901* (2019.01)
*G06F 16/21* (2019.01)

(52) U.S. Cl.
CPC ........ *G06F 16/9024* (2019.01); *G06F 16/211* (2019.01)

(58) Field of Classification Search
None
See application file for complete search history.

(56) References Cited

U.S. PATENT DOCUMENTS

2013/0097125 A1* 4/2013 Marvasti ................. G06F 16/90
707/E17.002
2018/0232402 A1* 8/2018 Bhatti ................. G06F 16/9024
2018/0315229 A1* 11/2018 Kim ........................ G06F 17/16

* cited by examiner

*Primary Examiner* — Umar Mian

(57) ABSTRACT

In one aspect, a method of generating synthetic graph data, comprising: operating a computer to define an islands schema specifying archipelago structures, wherein each archipelago structure comprises a root vertex type and zero or more additional vertex types; generating a plurality of disconnected archipelagos in parallel according to the islands schema, wherein each archipelago is generated by recursively creating vertices and edges according to probabilistic parameters specified in the islands schema; and stitching the disconnected archipelagos together by creating additional edges between vertices of different archipelagos according to joining rules specified in the islands schema.

14 Claims, 7 Drawing Sheets

```
Schema schema
Stream<Vertex> SA
Stream<Vertex> SB
Function<Vertex,Vertex,                    Stream<EdgeType>>      getEdgesBetween
Function<Vertex,Vertex,EdgeType            Double>                getWeight
Function<Vertex,Vertex,EdgeType            Edge>                  edgeConstructor
Function<Double, Function<Void,Edge>       Optional<Edge>>        flipWeightedCoin


Function<Pair<Vertex,Vertex>,              Stream<EdgeType>>      opertunityStream
  = (A,B) → getEdgesBetween(A, B, schema)

Function<Pair<Vertex, Vertex>,             Stream<Optional<Edge>> encounter
  = (A,B) → opertunityStream(A, B)
              .map(edgeType →
                flipWeightedCoin(
                  getWeight(A, B, edgeType, scheama),
                  () → edgeConstructor(A, B, edgeType))

Stream<Edge> stitchEdges
  = Zip(SA, SB)
      .flatMap(encounter)
      .filter(Optional::isPresent)
      .map(Optional::get)
```

FIGURE 5

500

```yaml
rootVertexTypes:
  - name: A
    likelihood: 1.0
    chancesToCreate: 1

vertexTypes:

  - name: A
    outEdges:
      - name: AtoB
        likelihood: 1.0
        chancesToCreate: 4
    properties: [ ]

  - name: B
    outEdges:
      - name: BtoC
        likelihood: .3
        chancesToCreate: 1
    properties:
      - name: name
        likelihood: 1.0
        valueGenerator:
          impl: ChoiceFromList
          args:
            choices: [ "Andy", "Bob", "Carol" ]
  - name: C
    outEdges: [ ]
    properties: [ ]


edgeTypes:
  - name: AtoB
    inVertex: B
    outVertex: A
    properties: [ ]
  - name: BtoC
    inVertex: C
    outVertex: B
    properties: [ ]
```

700

FIGURE 7

ISLANDS TECHNIQUE OF GRAPH SYNTHESIS

CLAIM OF PRIORITY

This application claims priority to U.S. Provisional Patent Application No. 63/606,096, filed on Dec. 5, 2023. This provisional patent application is hereby incorporated by reference in its entirety.

BACKGROUND

Graph data structures and property graphs have become increasingly important for representing complex relationships and dependencies in modern data architectures, yet generating realistic synthetic graph datasets for testing and development remains challenging. Prior approaches to graph synthesis have typically focused on generating entire graphs as single units, which can be computationally intensive and difficult to parallelize effectively. Traditional graph generation methods often struggle to maintain realistic structural properties while simultaneously preserving complex property constraints and relationship patterns that occur in real-world data. The concept of schema-driven graph generation has been explored in previous work, but existing approaches typically lack the flexibility to encode both structural patterns and probabilistic property distributions simultaneously. Current solutions for synthetic graph generation often fail to capture the natural clustering and subcommunity structures that characterize many real-world networks, particularly in business and social contexts. While various methods exist for generating property values in synthetic data, these approaches have not been well-integrated with graph structural generation in a way that preserves realistic relationships between vertex and edge properties. Existing graph generation tools typically lack sophisticated mechanisms for controlling the probability distributions of both structural features and property values in a unified framework. The challenge of generating large-scale synthetic graphs is further complicated by the need to maintain realistic local structure while ensuring desired global properties emerge from the generation process. Previous attempts at parallel graph generation have been limited by the inherent dependencies between different parts of the graph, making it difficult to achieve efficient parallelization while maintaining consistency in the generated structure.

SUMMARY OF THE INVENTION

In one aspect, a method of generating synthetic graph data, comprising: operating a computer to define an islands schema specifying archipelago structures, wherein each archipelago structure comprises a root vertex type and zero or more additional vertex types; generating a plurality of disconnected archipelagos in parallel according to the islands schema, wherein each archipelago is generated by recursively creating vertices and edges according to probabilistic parameters specified in the islands schema; and stitching the disconnected archipelagos together by creating additional edges between vertices of different archipelagos according to joining rules specified in the islands schema.

BRIEF DESCRIPTION OF THE DRAWINGS

FIG. 5 illustrates an example an example schema used for stitching archipelagos together, according to some embodiments.

FIG. 7 illustrates an example YAML Schema, according to some embodiments.

Figure 1:
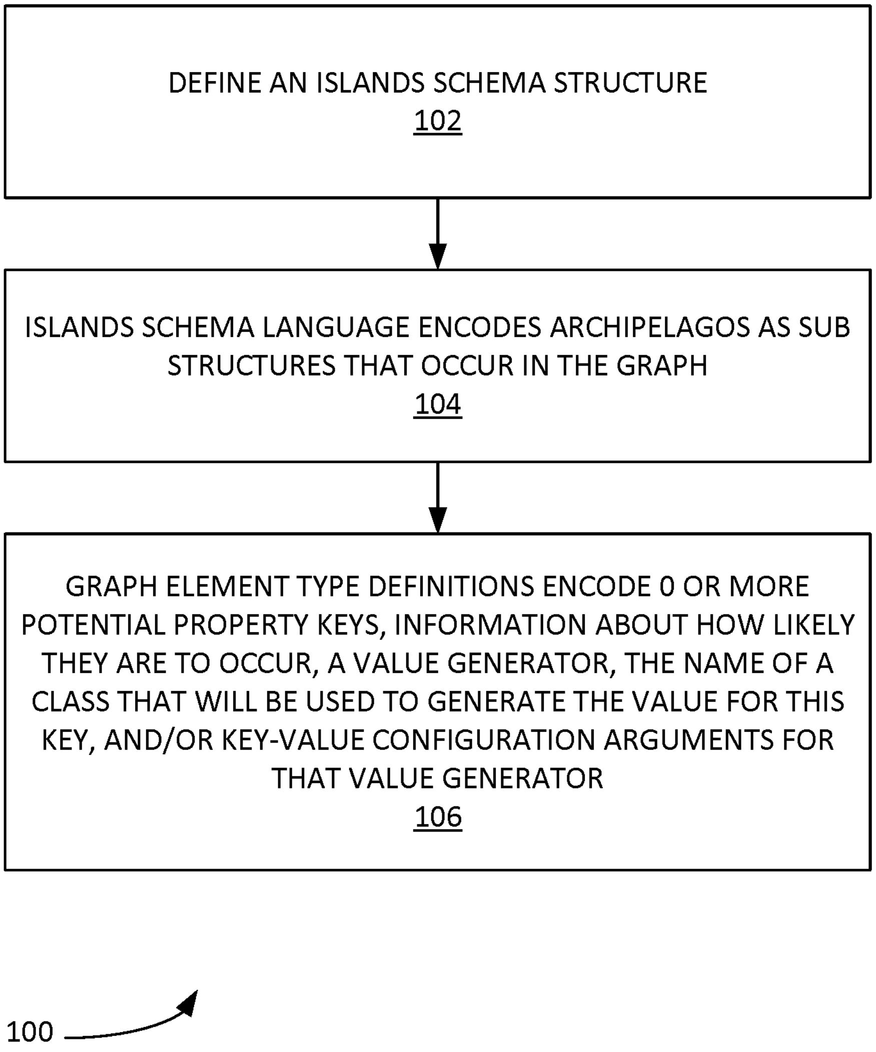
FIG. 1 illustrates an example process for implementing an islands technique of graph synthesis, according to some embodiments.

The Figures described above are a representative set and are not exhaustive with respect to embodying the invention.

DESCRIPTION

Disclosed are a system, method, and article of an islands technique of graph synthesis, according to some embodiments.

The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Database schema is the structure of a database described in a formal language (e.g. supported by a relational database management system (RDBMS)). Schema refers to the organization of data as a blueprint of how the database is constructed (e.g. divided into database tables in the case of relational databases). A database schema can be a set of formulas (e.g. sentences) called integrity constraints imposed on a database. These integrity constraints ensure compatibility between parts of the schema.

Graph is an abstract data type that is meant to implement the undirected graph and directed graph concepts from the field of graph theory within mathematics. A graph data structure consists of a finite set of vertices (e.g. nodes, points, etc.), together with a set of unordered pairs of these vertices for an undirected graph or a set of ordered pairs for a directed graph. These pairs are known as edges (e.g. links, lines, etc.), and for a directed graph are also known as edges but also sometimes arrows or arcs. The vertices may be part of the graph structure or may be external entities represented by integer indices or references. A graph data structure may also associate to each edge some edge value, such as a symbolic label or a numeric attribute (e.g. cost, capacity, length, etc.).

Property graph can provide relationships that are connections and a name (e.g. type). Other properties can be included. A property graph can be used for connections for data in various Data Architectures and/or data schemas. A property graph can include/show the relationships between metadata as well. Property graphs also show data dependencies as well.

Vertex (e.g. node) can be the fundamental unit of which graphs are formed.

YAML is a human-readable data serialization language. YAML can be used for configuration files and in applications where data is being stored or transmitted.

Example Methods

FIG. 1 illustrates an example process for implementing an islands technique of graph synthesis, according to some embodiments.

It is noted that in addition to the definitions discussion supra by way of example, Graphs encode structure information. Property Graphs can extend Graphs to encode key and value information laid into various elements of the structure. A Schema can be a Type System of a Graph, describing structure, potential property keys, property value types and their constraints.

In step 102, process 100 defines a Schema structure: the Islands Schema. The Islands Schema language encodes Archipelagos as sub structures that occur in the Graph in step 104. Archipelagos consist of a Root Vertex Type, zero or more additional Vertex Types, 1 or more Edge types per additional Vertex Type.

In step 106, Graph Element type definitions (e.g. Vertex or Edge types) encode 0 or more potential property keys, information about how likely they are to occur, as well as a Value Generator, the name of a Class that will be used to generate the value for this key, and key-value configuration arguments for that Value Generator. The key-value configuration arguments act as a system to communicate type constraints.

Figure 2:
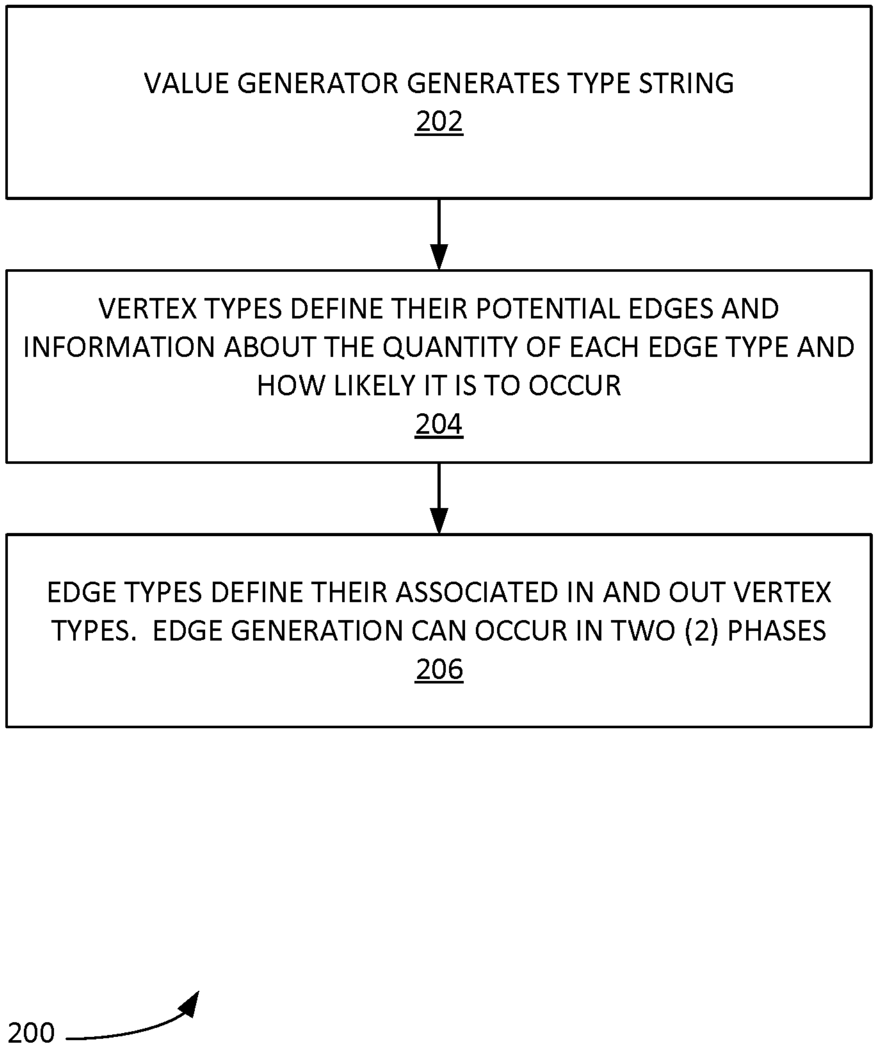
FIG. 2 illustrates an example process for generating Graph Element type definitions, according to some embodiments.

FIG. 2 illustrates an example process 200 for generating Graph Element type definitions, according to some embodiments. For example, a Value Generator generates type String in step 202. Configuration parameters can be defined: the maximum length of the String; the character set of the String; wherein the characters take on any order; etc. Configuration parameters supply constraining information to a Value Generator. Vertex Types define their potential edges and information about the quantity of each edge type and how likely it is to occur in step 204. Edge Types define their associated IN and OUT Vertex types. Edge generation can occur in two (2) phases in step 206. Phase 1 edges are created during the initial Archipelago genesis traversal. An Edge type may also specify it is a “Phase 2” edge. These edges can be created in a second pass as well. the point of the second pass is to “join” the archipelagos. Prior to this process, they are disjoint subgraphs that happen to occur within the same space.

Figure 3:
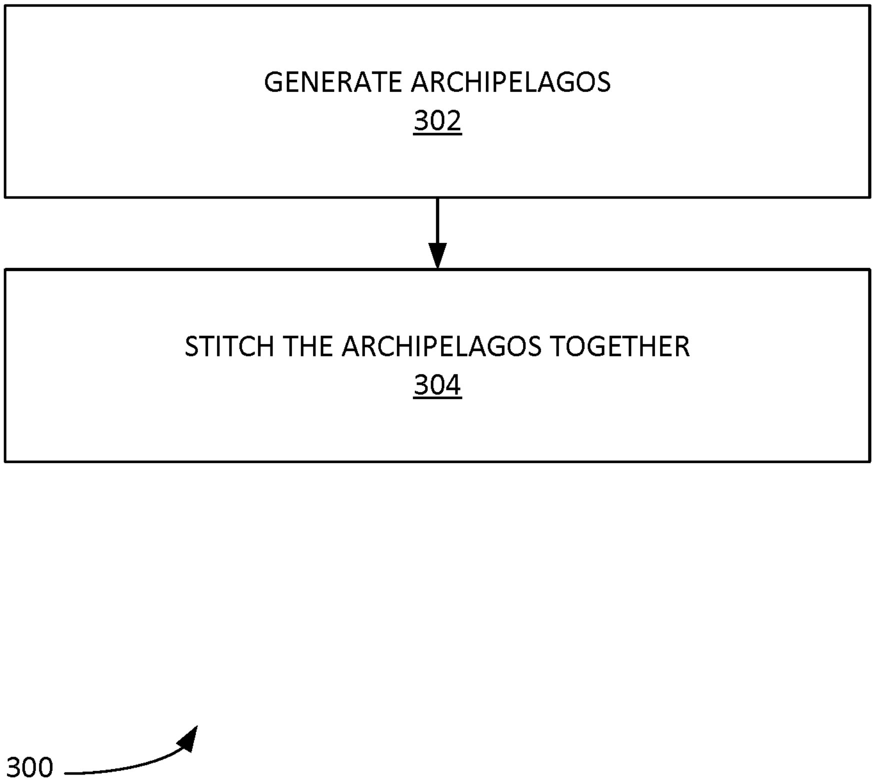
FIG. 3 illustrates an example process for edge generation, according to some embodiments.

FIG. 3 illustrates an example process 300 for edge generation, according to some embodiments. In step 302, process 300 generates Archipelagos (as phase 1).

Figure 4:
FIG. 4 illustrates an example process for generating Archipelagos, according to some embodiments.

FIG. 4 illustrates an example process 400 for generating Archipelagos, according to some embodiments. In step 402, for each Archipelago a root Vertex Type is defined. Different types of Archipelagos with different root vertex types may be defined in the same Schema. Each Vertex Type may have potential edges, and potential property keys. The range of values a property key may take on is defined by its associated value generator.

Edge Types are defined as having an IN-vertex type and an OUT-vertex type, and 0 or more potential property keys in step 404. In step 406, Edge Type Property Keys are defined in the same way as above, with a value generator constraining the range of values they can take on.

When a Vertex Type specifies a potential Edge, it specifies likelihood (0.0-1.0) to create and the number of potential chances to create this edge in step 408. When a Property Key is specified, the likelihood this key will be created as specified. It is noted that likelihood is the weight of a coin flip, and Chances to Create is the number of times generation is attempted, and the Weighted Coin is flipped.

The generation process starts at a root vertex. In step 410, each of its property keys are evaluated, and if the coin-flip comes up heads, the value generator is called, the key materialized, and the configured Value Generator is called to produce a value for the key.

After the vertex being generated takes on properties, the edge types in its schema are evaluated in step 412. The Vertex Types reference Edge Types by label. The Edge Types hold information about the Vertex Type on the other side of the edge as well as the potential property keys for the edge and their associated Value Generator configurations.

For each Edge Type specified by the Vertex Type being generated, a number of chances to create is defined in the schema in step 414. For each chance to create, the coin is flipped. If heads, process 400 walks (e.g. traverses) across the edge.

It is noted at this point that the actual writing of the edge is pushed onto the stack, then the generation of the vertex on the other side is put on top of it on the stack in step 416. In this way, in step 418, process 400 performs a recursive walk out on this branch of the tree first writing vertices then writing the edges connecting them. Because process is generating Archipelagos (e.g. Sub Graphs) this walk is bounded and stack depth is reasonably constrained.

At Phase 1, all the Archipelagos are disconnected and can be generated in parallel. This can be implemented by a Generator function mapping each value in a numeric range representing the number of Archipelagos to be created to an Archipelago, representing the Island chain that has taken on values. The Archipelago returns its root vertex, which returns its edges, which return their connected vertices, etc. in step 420. This can be recognized as the list of lists pattern. During processing, the nested lists of return values are transformed into a sequential stream per Archipelago. In this manner, Archipelagos can be generated in parallel.

In step 304, process 300 stitches the Archipelagos together. In the second phase, the graph takes on a total structure.

FIG. 5 illustrates an example an example schema 500 used for stitching archipelagos together, according to some embodiments. Schema 500 can be used for implementing process 600 discussed infra.

Figure 6:
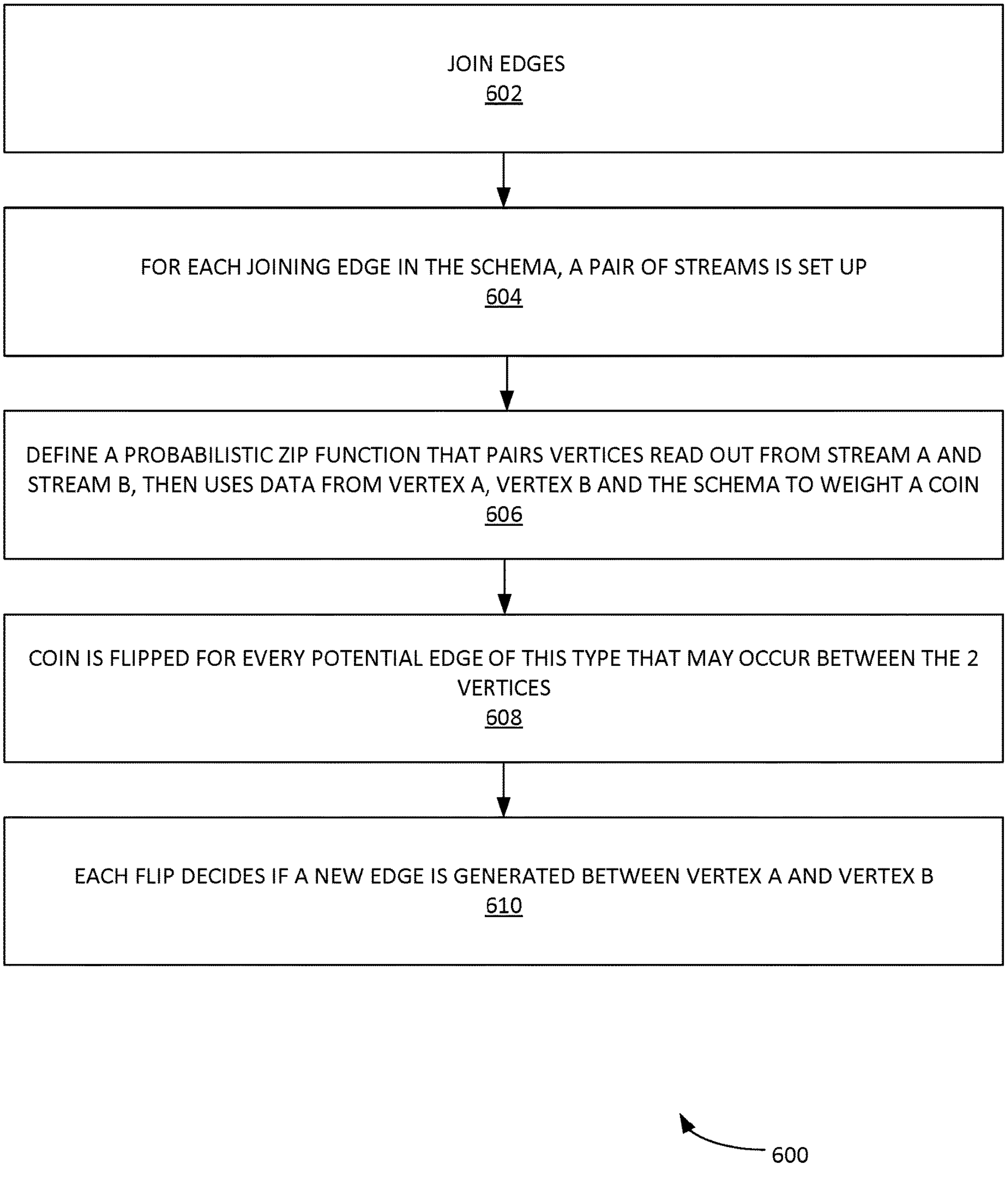
FIG. 6 illustrates an example process for stitching Archipelagos together, according to some embodiments.

FIG. 6 illustrates an example process 600 for stitching Archipelagos together, according to some embodiments. During Phase 1 sparse data was written (e.g. Archipelagos, disconnected Island Chains), now we need to knit it together.

In step 602, process 600 joins edges. Here edges that were not processed in the first phase are identified from the schema definition. Each Joining Edge type has a pair of Vertex Types associated with it.

For each joining edge in the schema, a pair of streams is set up in step 604. This pair of streams are reading back each previously materialized vertex in the joining edges inV type, and outV type, respectively. The order the elements are read back in can be shuffled as well.

Process 600 defines a Probabilistic Zip function that pairs vertices read out from Stream A and Stream B, then uses data from Vertex A, Vertex B and the Schema to weight a coin in step 606. This coin is flipped for every potential edge of this type that may occur between the 2 Vertices in step 608. Each flip decides if a new edge is generated between Vertex A and Vertex B in step 610.

FIG. 7 illustrates an example YAML Schema 700, according to some embodiments.

The Islands Technique for Graph Synthesis describes a high performance, parallel method of generating graph datasets that carry the characteristics described in the configured schema file. This method was derived during the implementation of a tool for generating datasets that are representative of various business use cases.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method of generating schema-constrained synthetic property graph data for use in a database schema or data architecture, the computer-implemented method comprising:

operating a computer to define an islands schema that functions as a type system for a property graph, the islands schema specifying archipelago structures, vertex types, edge types, property constraints, probabilistic parameters, and joining rules, wherein each archipelago structure comprises a root vertex type and zero or more additional vertex types;

for each vertex type specified by the islands schema, defining zero or more potential property keys, a likelihood that each potential property key is created, a value generator class for generating a property value for a created property key, and configuration parameters for the value generator class, wherein the configuration parameters constrain generated property values;

for each edge type specified by the islands schema, defining an in-vertex type, an out-vertex type, zero or more potential edge property keys, a likelihood value between 0.0 and 1.0 for creating the edge type, a number of chances to create the edge type, and an indication of whether the edge type is created during an initial archipelago generation phase or during a stitching phase;

generating, during the initial archipelago generation phase, a plurality of disconnected archipelagos in parallel according to the islands schema by executing a generator function that maps values in a numeric range to corresponding generated archipelagos;

for each disconnected archipelago of the plurality of disconnected archipelagos, creating a root vertex of the root vertex type specified for the disconnected archipelago and recursively generating connected vertices and edges from the root vertex according to the vertex types, edge types, likelihood values, numbers of chances to create, property keys, value generator classes, and configuration parameters specified in the islands schema;

wherein recursively generating the connected vertices and edges comprises evaluating each potential property key for a vertex according to the likelihood specified for the potential property key, calling the value generator class associated with the potential property key when the potential property key is selected, generating a property value constrained by the configuration parameters associated with the value generator class, evaluating edge types referenced by the vertex type of the vertex being generated, and determining whether to create each potential edge according to the likelihood value and the number of chances to create specified for the corresponding edge type;

pushing edge creation operations onto a stack and pushing vertex creation operations onto the stack above corresponding edge creation operations, such that vertices are generated before connecting edges associated with the vertices are written;

transforming nested lists of return values generated during the initial archipelago generation phase into sequential streams per disconnected archipelago;

stitching the plurality of disconnected archipelagos together during the stitching phase by identifying, from the islands schema, joining edge types that were not processed during the initial archipelago generation phase;

for each joining edge type, setting up a pair of streams that read previously materialized vertices of the in-vertex type and the out-vertex type associated with the joining edge type;

implementing a probabilistic zip function that pairs a first vertex read from a first stream of the pair of streams with a second vertex read from a second stream of the pair of streams, weights a probabilistic determination using data from the first vertex, data from the second vertex, and the islands schema, and determines whether to create a joining edge between the first vertex and the second vertex;

creating additional edges between vertices of different disconnected archipelagos according to the probabilistic zip function and the joining rules specified in the islands schema;

generating property values for the additional edges according to value generator classes and configuration parameters specified for the joining edge types in the islands schema;

validating property values generated for vertices and edges against constraints specified in the islands schema; and maintaining counts of generated edges of each edge type to determine consistency of the generated schema-constrained synthetic property graph data with the islands schema;

wherein separating the initial archipelago generation phase from the stitching phase enables the plurality of disconnected archipelagos to be generated independently in parallel while preserving schema-defined vertex types, edge types, property constraints, local archipelago structures, and cross-archipelago joining relationships in the schema-constrained synthetic property graph data.

2. The computer-implemented method of claim 1, wherein generating each disconnected archipelago during the initial archipelago generation phase comprises creating the root vertex of the root vertex type specified by the islands schema for the disconnected archipelago, assigning one or more property values to the root vertex according to one or more value generator classes specified in the islands schema, and recursively generating connected vertices and edges from the root vertex according to the vertex types and the edge types specified in the islands schema.

3. The computer-implemented method of claim 2, wherein the probabilistic parameters specified in the islands schema comprise, for each edge type of one or more edge types specified by a corresponding vertex type, a likelihood value between 0.0 and 1.0 and a number of chances to create an edge of the edge type.

4. The computer-implemented method of claim 3, wherein stitching the plurality of disconnected archipelagos together during the stitching phase comprises identifying pairs of vertex types associated with joining edge types specified in the islands schema, creating streams of previously materialized vertices of each identified vertex type from the plurality of disconnected archipelagos, and probabilistically creating additional edges between vertices from different streams according to the joining rules specified in the islands schema.

5. The computer-implemented method of claim 4, wherein the islands schema specifies, for each vertex type, zero or more potential property keys, for each potential property key, a value generator class and configuration parameters for the value generator class, and, for each edge type, an in-vertex type and an out-vertex type.

6. The computer-implemented method of claim 5, wherein recursively generating the connected vertices and edges comprises pushing edge creation operations onto the stack, pushing vertex creation operations onto the stack above corresponding edge creation operations, and executing the stack-based operations to generate vertices before writing connecting edges associated with the vertices.

7. The computer-implemented method of claim 6, further comprising shuffling an order in which the previously materialized vertices are read from at least one stream of the pair of streams when creating the additional edges between the plurality of disconnected archipelagos.

8. A system for generating schema-constrained synthetic property graph data for use in a database schema or data architecture, the system comprising:

a processor; and a memory storing instructions that, when executed by the processor, cause the system to:

define an islands schema that functions as a type system for a property graph, the islands schema specifying archipelago structures, vertex types, edge types, property constraints, probabilistic parameters, and joining rules, wherein each archipelago structure comprises a root vertex type and zero or more additional vertex types;

for each vertex type specified by the islands schema, define zero or more potential property keys, a likelihood that each potential property key is created, a value generator class for generating a property value for a created property key, and configuration parameters for the value generator class, wherein the configuration parameters constrain generated property values;

for each edge type specified by the islands schema, define an in-vertex type, an out-vertex type, zero or more potential edge property keys, a likelihood value between 0.0 and 1.0 for creating the edge type, a number of chances to create the edge type, and an indication of whether the edge type is created during an initial archipelago generation phase or during a stitching phase;

generate, during the initial archipelago generation phase, a plurality of disconnected archipelagos in parallel according to the islands schema by executing a generator function that maps values in a numeric range to corresponding generated archipelagos;

for each disconnected archipelago of the plurality of disconnected archipelagos, create a root vertex of the root vertex type specified for the disconnected archipelago and recursively generate connected vertices and edges from the root vertex according to the vertex types, edge types, likelihood values, numbers of chances to create, property keys, value generator classes, and configuration parameters specified in the islands schema;

wherein, to recursively generate the connected vertices and edges, the instructions cause the system to evaluate each potential property key for a vertex according to the likelihood specified for the potential property key, call the value generator class associated with the potential property key when the potential property key is selected, generate a property value constrained by the configuration parameters associated with the value generator class, evaluate edge types referenced by the vertex type of the vertex being generated, and determine whether to create each potential edge according to the likelihood value and the number of chances to create specified for the corresponding edge type;

push edge creation operations onto a stack and push vertex creation operations onto the stack above corresponding edge creation operations, such that vertices are generated before connecting edges associated with the vertices are written;

transform nested lists of return values generated during the initial archipelago generation phase into sequential streams per disconnected archipelago;

stitch the plurality of disconnected archipelagos together during the stitching phase by identifying, from the islands schema, joining edge types that were not processed during the initial archipelago generation phase;

for each joining edge type, set up a pair of streams that read previously materialized vertices of the in-vertex type and the out-vertex type associated with the joining edge type;

implement a probabilistic zip function that pairs a first vertex read from a first stream of the pair of streams with a second vertex read from a second stream of the pair of streams, weights a probabilistic determination using data from the first vertex, data from the second vertex, and the islands schema, and determines whether to create a joining edge between the first vertex and the second vertex;

create additional edges between vertices of different disconnected archipelagos according to the probabilistic zip function and the joining rules specified in the islands schema;

generate property values for the additional edges according to value generator classes and configuration parameters specified for the joining edge types in the islands schema;

validate property values generated for vertices and edges against constraints specified in the islands schema; and maintain counts of generated edges of each edge type to determine consistency of the generated schema-constrained synthetic property graph data with the islands schema;

wherein separation of the initial archipelago generation phase from the stitching phase enables the plurality of disconnected archipelagos to be generated independently in parallel while preserving schema-defined vertex types, edge types, property constraints, local archipelago structures, and cross-archipelago joining relationships in the schema-constrained synthetic property graph data.

9. The system of claim 8, wherein, to generate each disconnected archipelago during the initial archipelago generation phase, the instructions cause the system to create the root vertex of the root vertex type specified by the islands schema for the disconnected archipelago, assign one or more property values to the root vertex according to one or more value generator classes specified in the islands schema, and recursively generate connected vertices and edges from the root vertex according to the vertex types and the edge types specified in the islands schema.

10. The system of claim 9, wherein the probabilistic parameters specified in the islands schema comprise, for each edge type of one or more edge types specified by a corresponding vertex type, a likelihood value between 0.0 and 1.0 and a number of chances to create an edge of the edge type.

11. The system of claim 10, wherein, to stitch the plurality of disconnected archipelagos together during the stitching phase, the instructions cause the system to identify pairs of vertex types associated with joining edge types specified in the islands schema, create streams of previously materialized vertices of each identified vertex type from the plurality of disconnected archipelagos, and probabilistically create additional edges between vertices from different streams according to the joining rules specified in the islands schema.

12. The system of claim 11, wherein the islands schema specifies, for each vertex type, zero or more potential property keys, for each potential property key, a value generator class and configuration parameters for the value generator class, and, for each edge type, an in-vertex type and an out-vertex type.

13. The system of claim 12, wherein, to recursively generate the connected vertices and edges, the instructions cause the system to push edge creation operations onto the stack, push vertex creation operations onto the stack above corresponding edge creation operations, and execute stack-based operations to generate vertices before writing connecting edges associated with the vertices.

14. The system of claim 13, wherein the instructions further cause the system to shuffle an order in which the previously materialized vertices are read from at least one stream of the pair of streams when creating the additional edges between the plurality of disconnected archipelagos.

* * * * *